United States Patent
Tendola et al.

(10) Patent No.: US 10,000,275 B2
(45) Date of Patent: Jun. 19, 2018

(54) AIRCRAFT HYBRID FLIGHT CONTROL SYSTEM

(71) Applicant: MECAER AVIATION GROUP S.p.A., Borgomanero (IT)

(72) Inventors: Andrea Tendola, Borgomanero (IT); Vittorio Lignarolo, Borgomanero (IT)

(73) Assignee: MECAER AVIATION GROUP S.p.A., Borgomanero (IT)

( * ) Notice: Subject to any disclaimer, the term of this patent is extended or adjusted under 35 U.S.C. 154(b) by 485 days.

(21) Appl. No.: 14/717,666

(22) Filed: May 20, 2015

(65) Prior Publication Data

US 2016/0340025 A1    Nov. 24, 2016

(30) Foreign Application Priority Data

May 20, 2014  (IT) .............................. TO2014A0397

(51) Int. Cl.
 *B64C 13/28*  (2006.01)
 *B64C 13/50*  (2006.01)
 *B64F 5/00*  (2017.01)

(52) U.S. Cl.
 CPC ............ *B64C 13/28* (2013.01); *B64C 13/503* (2013.01); *B64F 5/00* (2013.01)

(58) Field of Classification Search
 CPC ......... B64C 13/22; B64C 13/28; B64C 13/34; B64C 13/46; B64C 13/503
 See application file for complete search history.

(56) References Cited

U.S. PATENT DOCUMENTS

| 2,823,879 A | * | 2/1958 | Smith | ..................... B64C 13/24 244/236 |
| 2,852,215 A | | 9/1958 | Ochtman | |
| 2,859,926 A | | 11/1958 | Westbury | |
| 2,991,028 A | * | 7/1961 | Sedgfield | ................ B64C 13/00 244/194 |
| 3,011,482 A | | 12/1961 | Elmer et al. | |

(Continued)

FOREIGN PATENT DOCUMENTS

| DE | 1111026 B | 7/1961 |
| EP | 2502825 A1 | 9/2012 |

(Continued)

OTHER PUBLICATIONS

Italian Search Report of IT-TO20140397 dated Dec. 11, 2014.
(Continued)

*Primary Examiner* — Richard R Green
(74) *Attorney, Agent, or Firm* — Amster, Rothstein & Ebenstein LLP (57) ABSTRACT

An aircraft hybrid flight control system comprising a manual control element, a mechanical transmission interposed between the manual control element and a control surface, an electromechanical actuator and a coupling unit configured to connect selectively the control surface to the mechanical transmission in a manual control mode and to the electromechanical actuator in a fly-by-wire control mode; the coupling unit is configured to maintain the mechanical transmission in a condition of substantial continuity with said control surface even in fly-by-wire mode, but for a freedom of relative motion of pre-set amplitude.

12 Claims, 8 Drawing Sheets

(56) References Cited

U.S. PATENT DOCUMENTS

| | | | | |
|---|---|---|---|---|
| 3,750,984 A * | 8/1973 | Mouttet | ................ | B64C 13/46 |
| | | | | 244/223 |
| 4,004,537 A * | 1/1977 | Nilsson | ................ | B63H 25/16 |
| | | | | 114/144 E |
| 4,228,386 A * | 10/1980 | Griffith | ................ | B64C 13/46 |
| | | | | 244/223 |
| 6,491,148 B2 * | 12/2002 | Rodrigues | ............... | B64C 13/22 |
| | | | | 192/107 M |
| 8,907,536 B2 * | 12/2014 | Cremiere | ............... | B64C 13/22 |
| | | | | 244/196 |

FOREIGN PATENT DOCUMENTS

| | | |
|---|---|---|
| GB | 777273 A | 6/1957 |
| GB | 803577 A | 10/1958 |

OTHER PUBLICATIONS

"Mechanical Backup for Fly-By-Wire Control System," NTIS Tech Notes, US Department of Commerce, Springfield, VA, US, May 31, 1992 (May 31, 1992), p. 411, XP000327678, ISSN:0889-8664.

* cited by examiner

AIRCRAFT HYBRID FLIGHT CONTROL SYSTEM

The present invention relates to an aircraft hybrid flight control system.

The control system of the invention is particularly, but not exclusively, adapted to be used on training aircrafts or trainers, typically provided with mechanical rod flight controls.

SUMMARY OF THE INVENTION

It is the object of the present invention to provide a hybrid flight control system which combines the advantages of a traditional mechanical control, in particular in terms of cost competitiveness and implementation flexibility, with the additional functionalities of a fly-by-wire (FBW) flight control, without requiring the burdensome levels of redundancy imposed by current safety regulations for purely electronic flight control systems.

It is a further object of the present invention to provide a method for converting a mechanical flight control system into a hybrid flight control system.

The aforesaid objects are achieved by a flight control system according to claim 1, and by a reconfiguration method according to claim 12.

BRIEF DESCRIPTION OF THE DRAWINGS

For a better understanding of the present invention, a preferred embodiment is described, by way of a non-limiting example and with reference to the accompanying drawings, in which.

DETAILED DESCRIPTION OF THE INVENTION

Figure 1:
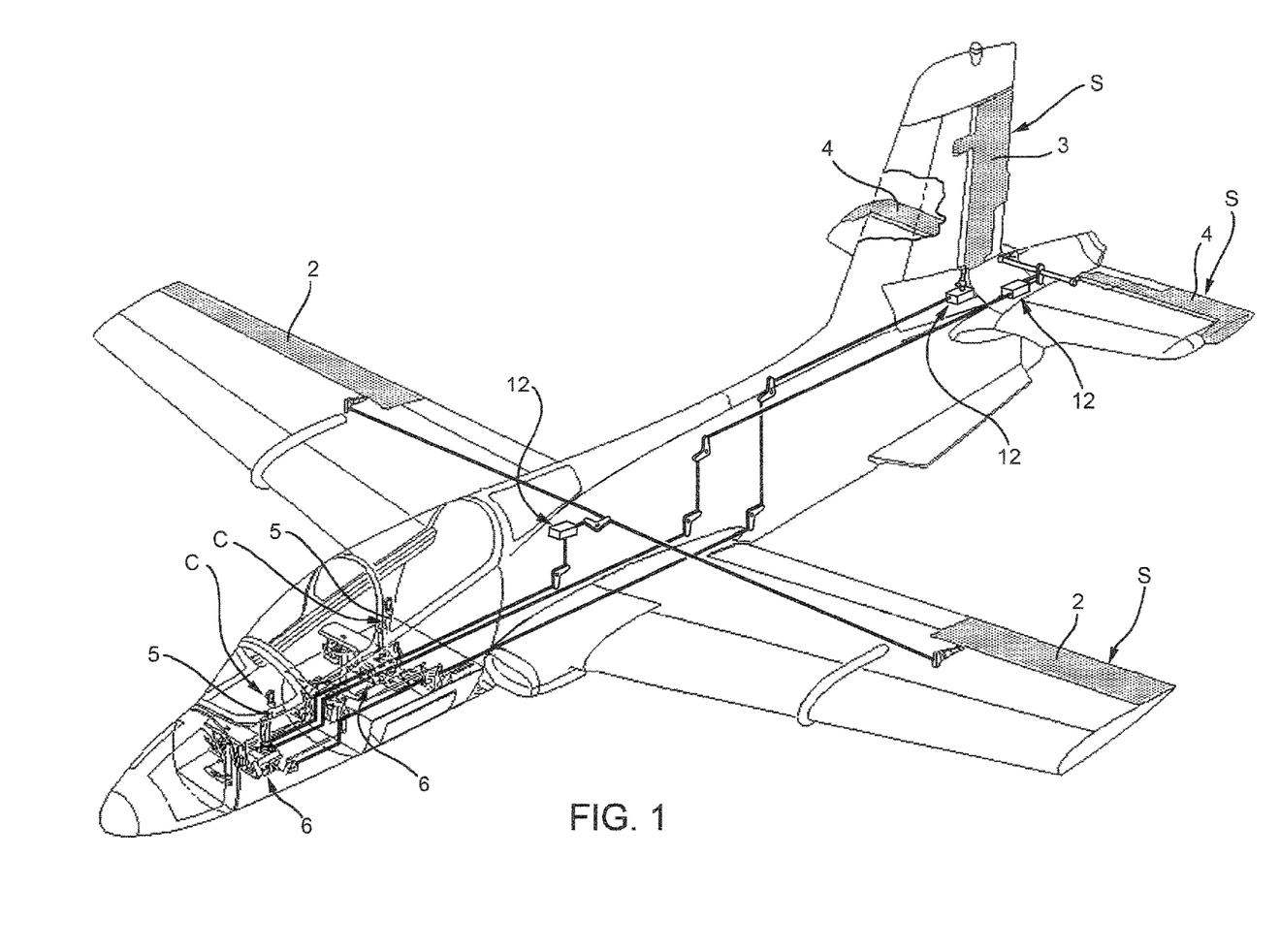
FIG. 1 is a diagrammatic perspective view of an aircraft provided with a hybrid flight control system according to the invention.

Reference numeral 1 in FIG. 1 indicates an aircraft as a whole, for example a trainer, provided with a plurality of control surfaces generally indicated by S. Such surfaces comprise in particular the ailerons 2, the direction rudder 3, and the elevator 4.

Aircraft 1 also comprises manual control elements, generally indicated by C, for controlling the surfaces S. In particular, aircraft 1 may comprise, for each piloting position, a control bar 5 for controlling the position of the ailerons 2 and elevator 4, and pedals 6 for controlling the direction rudder 3.

According to the present invention, aircraft 1 is provided with a control system 10 of the hybrid type, i.e. adapted to operate according to two modes: purely mechanical and fly-by-wire (FBW).

Figure 2:
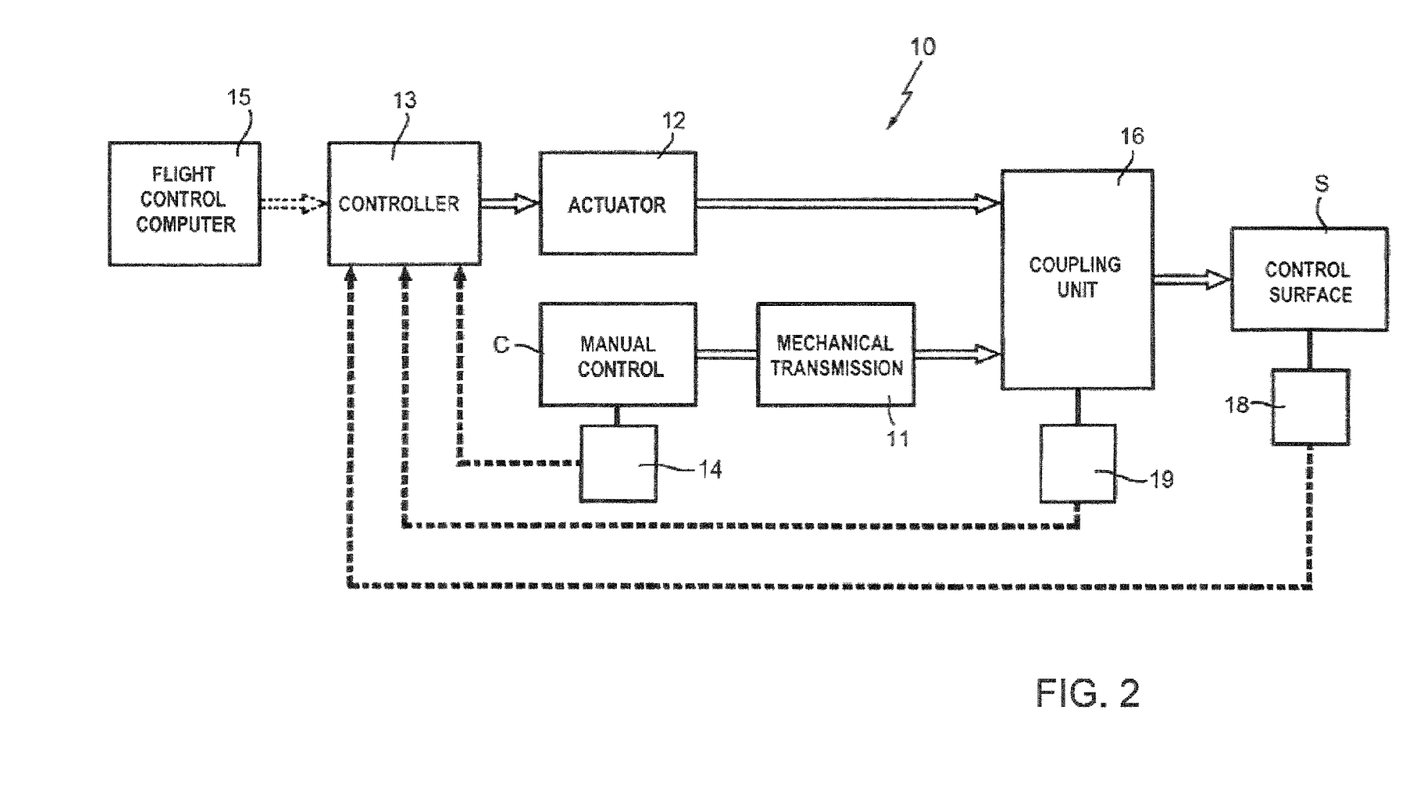
FIG. 2 is a functional block diagram of the flight control system in FIG. 1.

With reference to FIG. 2, system 10 comprises a mechanical transmission 11 for each control surface S, which is adapted to transmit the controls from the manual control element C to the corresponding control surface S in mechanical control mode.

System 10 also comprises, for each control surface S, an electromechanical actuator 12 controlled in closed loop by a controller 13.

In particular, controller 13 receives reference signals from sensors 14 associated with the manual control element C and from a flight control computer 15, and feedback signals from a position transducer 18 associated with the control surface S.

System 10 further comprises a coupling unit 16 adapted to connect selectively the control surface S to the mechanical transmission 11 and actuator 12.

As an alternative to or in combination with the sensors 18 of absolute type, the system may use a differential position transducer 19 associated with the coupling unit 16 and adapted to detect the shifts between the position of the mechanical transmission 11 and the control surface S when decoupled from each other and from the coupling unit 16.

Figure 3:
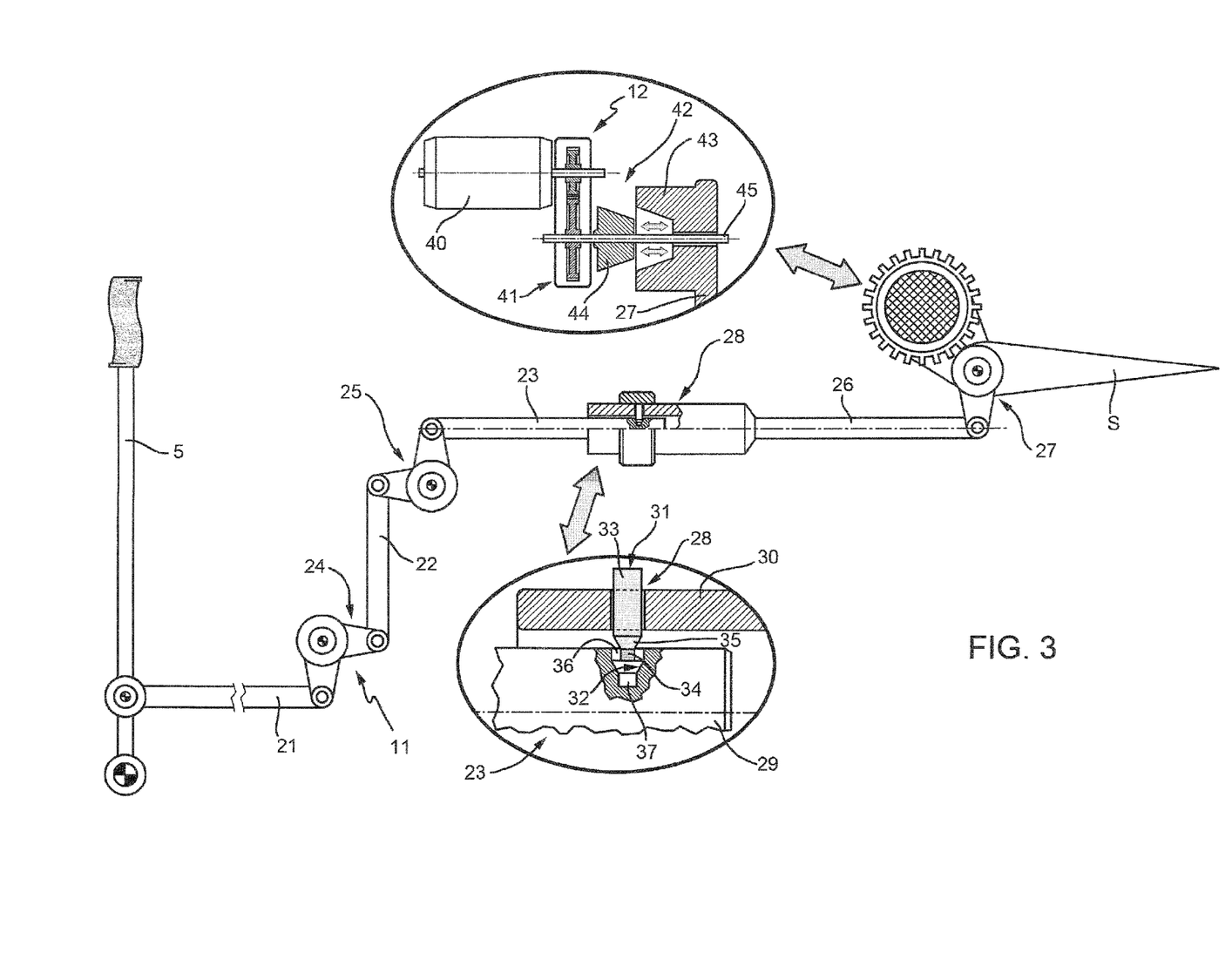
FIG. 3 diagrammatically shows a transmission chain of the flight control system of the invention, using a rotating actuator.

FIG. 3 diagrammatically shows a first embodiment, in which the mechanical transmission 11 consists of a plurality of rods 21, 22, 23 interposed between the control bar 5 and the control surface S and connected to one another, in a conventional manner, by means of return levers 24, 25. The outgoing rod 23 of transmission 11 is selectively connectable to a return rod 26 hinged to a control lever 27, which is integral with the control surface S by means of a first coupling 28.

More specifically, the outgoing rod 23 and the return rod 26 are coaxial and have respective ends 29, telescopically coupled to each other. The first coupling 28 conveniently comprises a radial pin 31 carried by the return rod 26 and adapted to cooperate with a radial hole 32 obtained on the end 30 of the outgoing rod 23.

Pin 31 is provided with a main portion 33, with a reduced diameter end 34, and with an intermediate portion 35 for joining the main portion 33 and the end 34.

Hole 32 has an inlet portion 36 having such a diameter as to receive the main portion 33 of pin 31 substantially without clearance, a bottom portion 37 having such a diameter as to receive the end 34 of pin 31 substantially without clearance, and an intermediate portion of shape and size corresponding to those of the intermediate portion of pin 31.

Pin 31 is movable, under the thrust of an actuator (not shown), between a retracted position (FIG. 4a), in which end 34 alone of pin 31 engages the inlet portion 36 of hole 32 with clearance, thus making the outgoing rod 23 and the return rod 26 sliding relative to each other with a limited freedom of relative motion defined by the aforesaid clearance, and an advanced position (FIG. 5a), in which it completely engages the hole 32 of the outgoing rod 23 thus making the latter integral with the return rod 26.

In this embodiment, the use of the differential position transducer 19 (not shown in FIGS. 3 to 5b) is convenient, since it is arranged so as to detect the position shifts between the outgoing rod 23 and the return rod 26 with respect to a relative zero position defined by the engaged position between pin 31 and hole 32.

Actuator 12, which in the embodiment diagrammatically shown in FIG. 3 consists of an electric motor 40 provided with an outgoing reducer 41, is selectively connectable to the control rod 27 by means of a second coupling 42 (purely diagrammatically shown in the enlarged detail in FIG. 3). The first coupling 28 and the second coupling 42 globally form the coupling unit 16 in FIG. 2.

The second coupling 42 in the diagrammatic embodiment in FIG. 3 is a conical friction coupling comprising a first friction wheel 43 integral with the control lever 27 and a second friction wheel 44 prismatically coupled to an outgoing shaft 45 of reducer 41. The second friction wheel 44 is axially movable between a retracted position (FIG. 5b), in which it is deviated from the first friction wheel 43, and a coupling position (FIG. 4b), in which it engages the first friction wheel 43 thus making the control lever 27 integral with the outgoing shaft 45.

The operation of system 10 is as follows.

The system may operate according to two modes: FBW and manual. The two modes may be manually selected at any time by the pilot; the manual mode may also be automatically activated by the control system when a failure is detected.

Figure 5A:
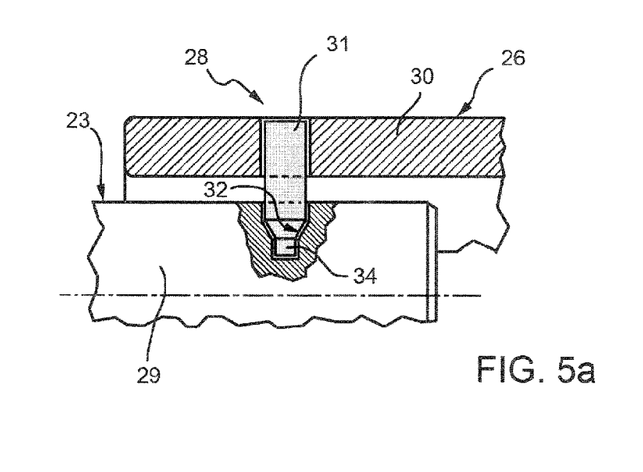
FIGS. 5a and 5b diagrammatically show the positions of the two couplings in an FBW operating mode of the flight control system.
Figure 5B:
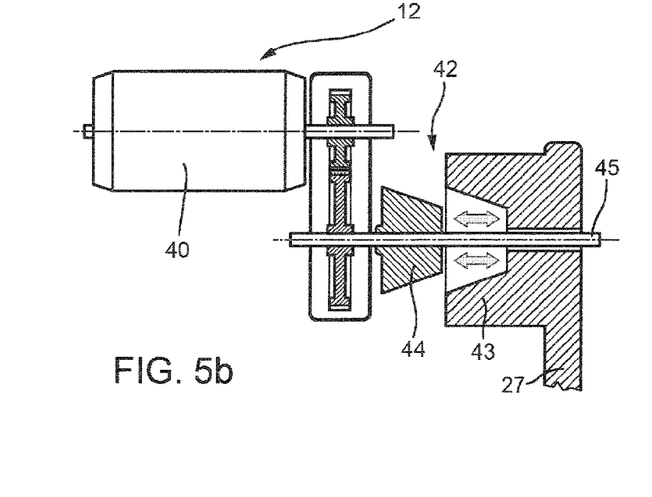

In manual mode, the position of the couplings 28 and 42 is that shown in FIGS. 5a, 5b: coupling 28 is "closed", thus making the rods 23 and 26 integral, while coupling 42 is "open", thus decoupling actuator 12 from the control surface S. Therefore, the controls manually imparted with the manual control element C are transmitted through the mechanical transmission 11 and the return rod 26 to the control lever 27, which is integral to the control surface S.

Figure 4A:
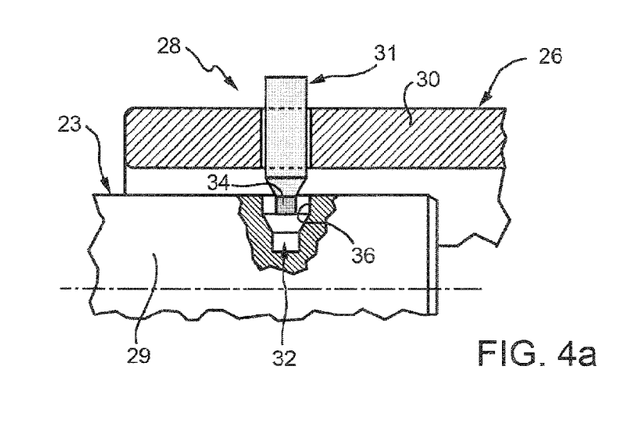
FIGS. 4a and 4b diagrammatically show the positions of two couplings of the drive chain in figure in a manual operating mode of the flight control system.
Figure 4B:
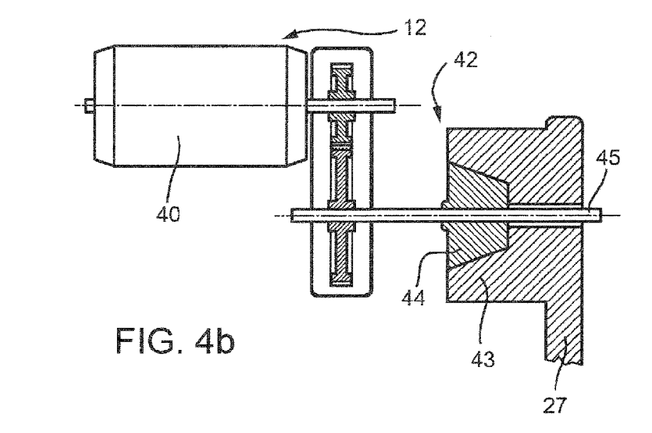

In FBW mode, the position of the couplings 28 and is that shown in FIGS. 4a, 4b: coupling 28 is "open", thus leaving a limited freedom of relative translation between the rods 23 and 26, while coupling 42 is "closed", thus making the control lever 27 integral with the outgoing shaft 45 of actuator 12.

In this mode, controller 13 controls actuator 12 in closed loop according to the feedback signal received from the differential position transducer 19.

It is worth noting that a substantial continuity of the manual kinematic control chain is also ensured in FBW mode, but for the clearance in coupling 28. The return rod 26, which is connected to the control surface S by means of the control lever 27, follows the movements of the control surface S and therefore is kept permanently synchronized with the mechanical transmission 11 constrained to the manual control element C. Therefore, the switching from FBW mode to manual mode may be done at any time and without any control loss, thus ensuring the proportionality between manual controls and the movements of the control surface S.

Figure 6:
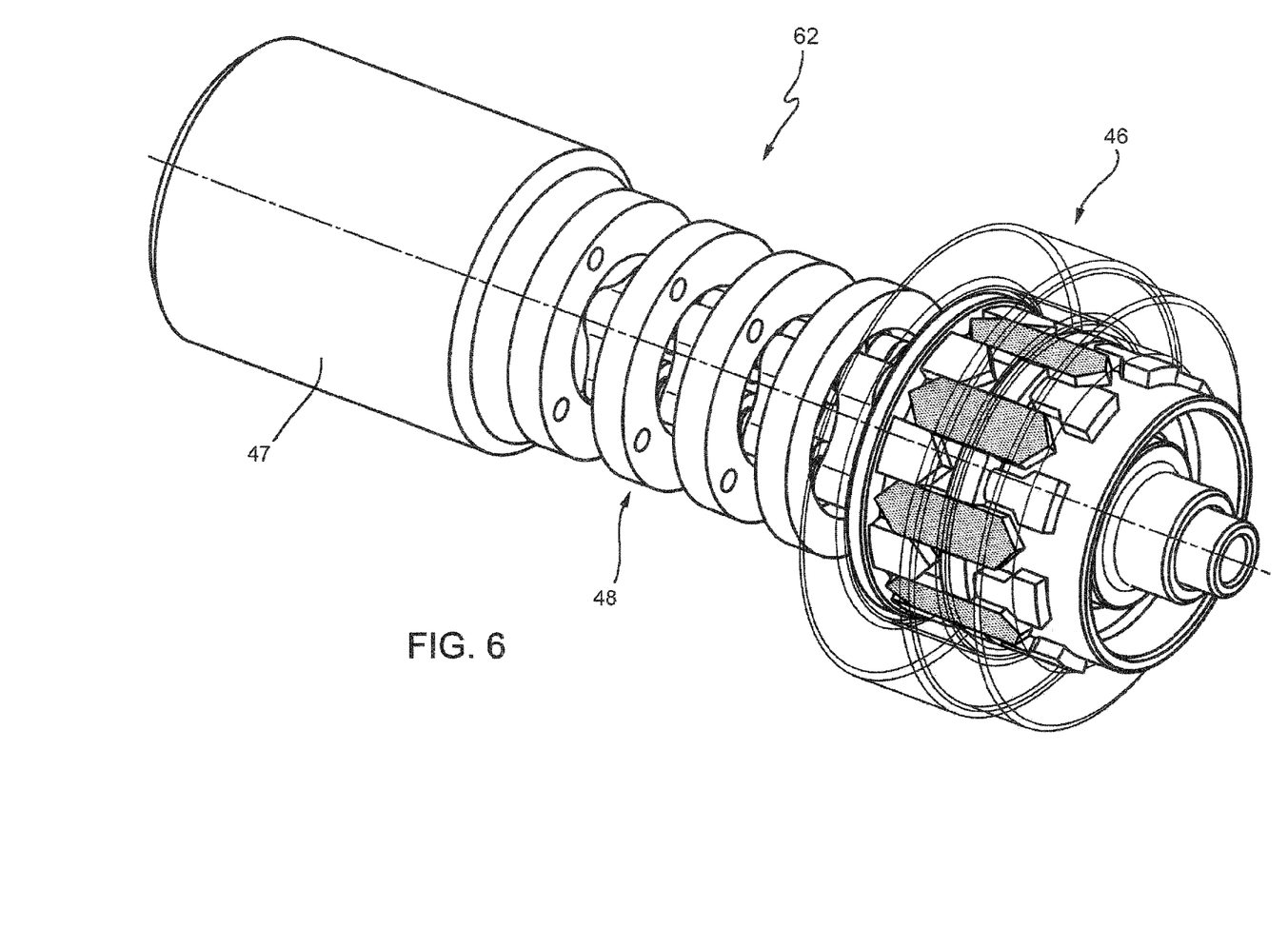
FIG. 6 is a perspective view of an actuator and a corresponding coupling unit according to a different embodiment of the invention.
Figures 7, 8, 9:
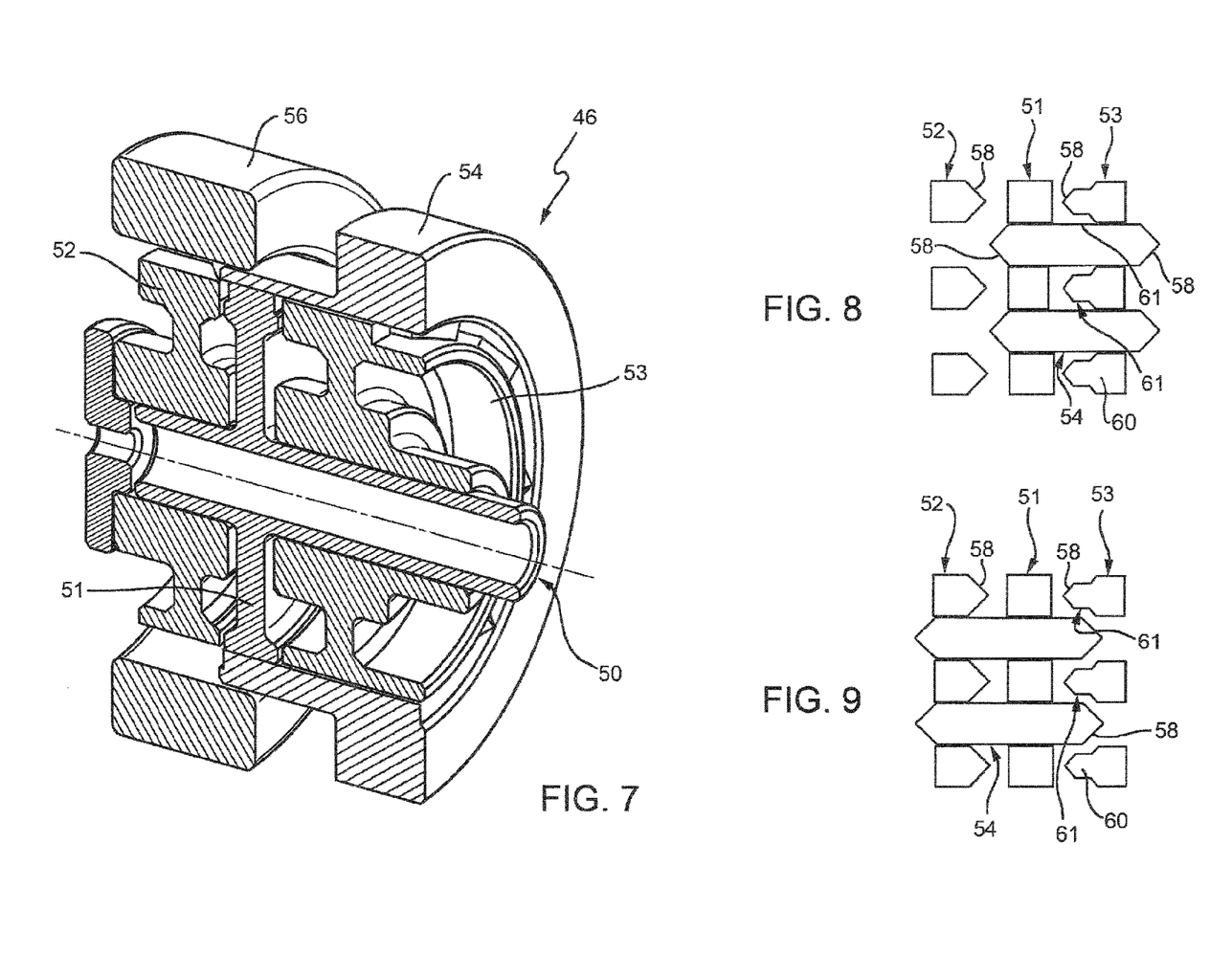
FIG. 7 is a perspective sectional view of the coupling unit in FIG. 6.
FIGS. 8 and 9 diagrammatically show the coggings of the elements of the coupling unit in FIG. 7, in two different operating positions.

FIGS. 6 and 7 show a different embodiment of the electromechanical actuator, indicated with 62, and of the coupling unit, indicated with 46.

Actuator 62 (FIG. 6) comprises an electric motor 47 and a multistage epicyclic reducer 48, connected at the outlet to the electric motor 47 and coaxial thereto.

The coupling unit 46 (shown in greater detail in FIG. 7) is adapted to allow the selective connection of the movable surface S with actuator 62 and with the mechanical transmission 11. With respect to the embodiment shown in FIG. 3, the coupling unit 46 integrates the functions of the couplings 12 and 28 in a single unit. Therefore, the rods 23 and 26 may be replaced by a single outgoing rod (not shown) of the mechanical transmission 11, which is connected to the control lever 27, which in this case is not integral with the control surface S but is selectively connectable thereto by means of the coupling unit 46, as clarified below.

More specifically, the coupling unit 46 comprises a shaft 50, which is integral with the control lever 27, on which a cogged wheel 51 is keyed. Shaft 50 is coaxial to actuator 62. On shaft 50, two further cogged wheels 52, 53 are mounted so as to be idle, which are located on axially opposite sides with respect to the cogged wheel 51 and are integral with an outgoing element 53 of reducer 48 and with the control lever 27, respectively.

A selector gear 54 provided with an internal cogging 55 is always coupled to the cogged wheel 51, and is axially movable to mesh selectively with wheel 52, thus connecting shaft 52 to actuator 62, or with wheel 53, thus connecting shaft 50 with the control lever 27. The axial translation of the selector gear 54 is controlled by an electromechanical linear actuator 56 of any type, for example with a solenoid.

FIGS. 8 and 9 diagrammatically show the coggings of the selector gear 54 and of the wheels 51, 52, 53 under the two operating conditions described above.

The cogs of the aforesaid coggings are conveniently provided with front tapers 58 in order to promote the front coupling and the centering during the coupling. The cogging of wheel 53 is conveniently provided with a front portion 60 in which the hollows 61 between the cogs are wider.

FIG. 8 shows the manual control mode, in which selector 54 is coupled to wheel 53 without relative clearance, and is completely decoupled from wheel 52.

FIG. 9 shows the FBW control mode instead, in which the selector gear 54 is coupled to wheel 52 and engages the front portion 60 of wheel 53. The continuity of the mechanical control line is thus ensured, but for the clearance determined by the greater width of the hollows 61 with respect to the cogs of the selector gear 54, in a conceptually similar manner and with equivalent purposes with respect to the description of coupling 28 in the embodiment in FIG. 3.

Figure 10:
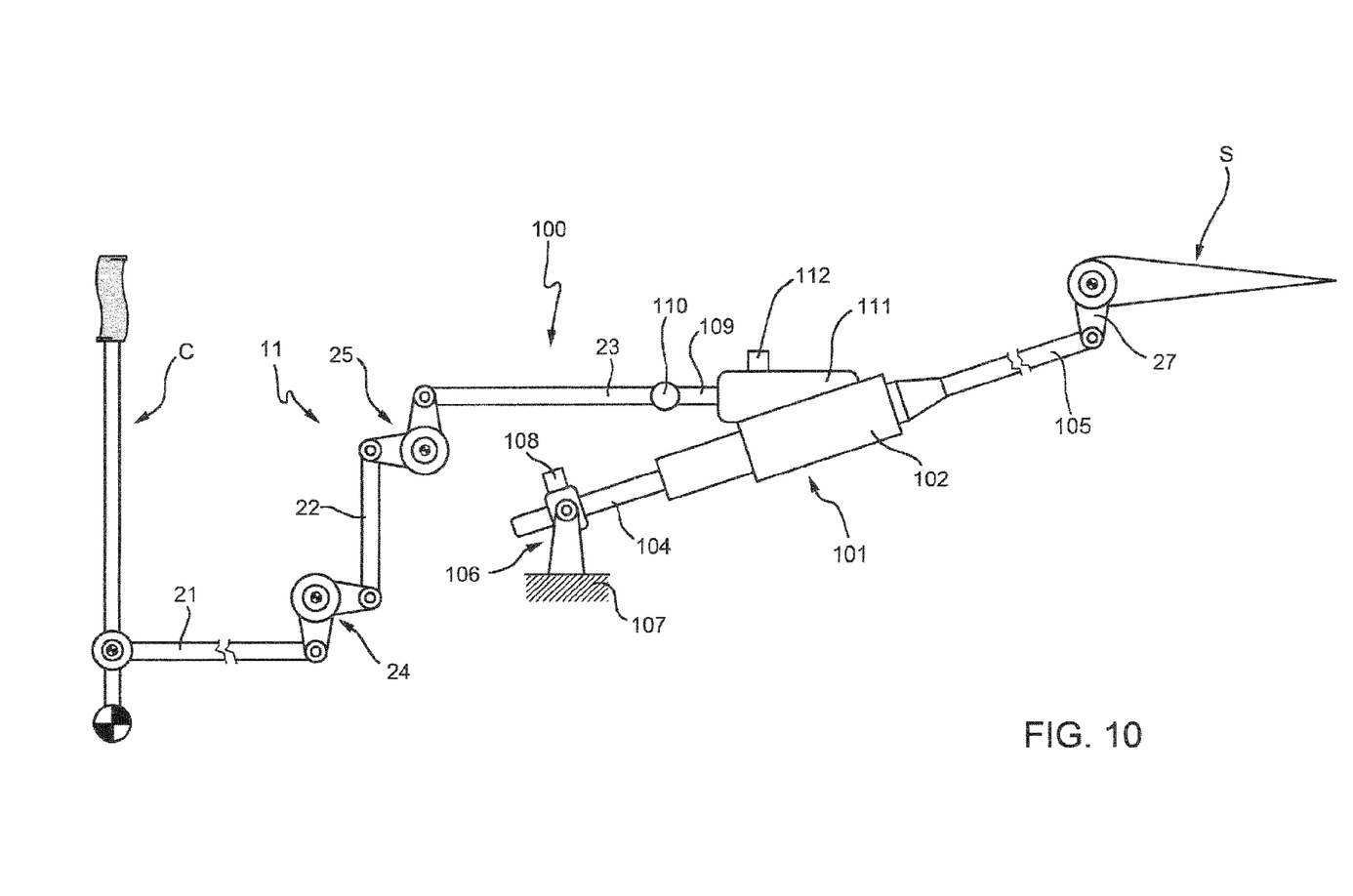
FIG. 10 diagrammatically shows a transmission chain of the control system of the invention, using a linear actuator.

FIG. 10 shows a flight control system 100 which differs from the system 10 described, essentially in that it uses an actuator 101 of the linear type rather than of the rotating type.

Actuator 101 (FIG. 11), known per se, essentially comprises a tubular body 102, an electric motor 103 accommodated inside body 102, and a shank 104 coaxial to body 102, controlled by the motor by means of a reducer (not shown), the final stage of which, for example with screw/female screw with recirculating balls or rollers, is configured to convert the rotary motion of motor 103 into a translation motion of shank 104.

Figure 11:
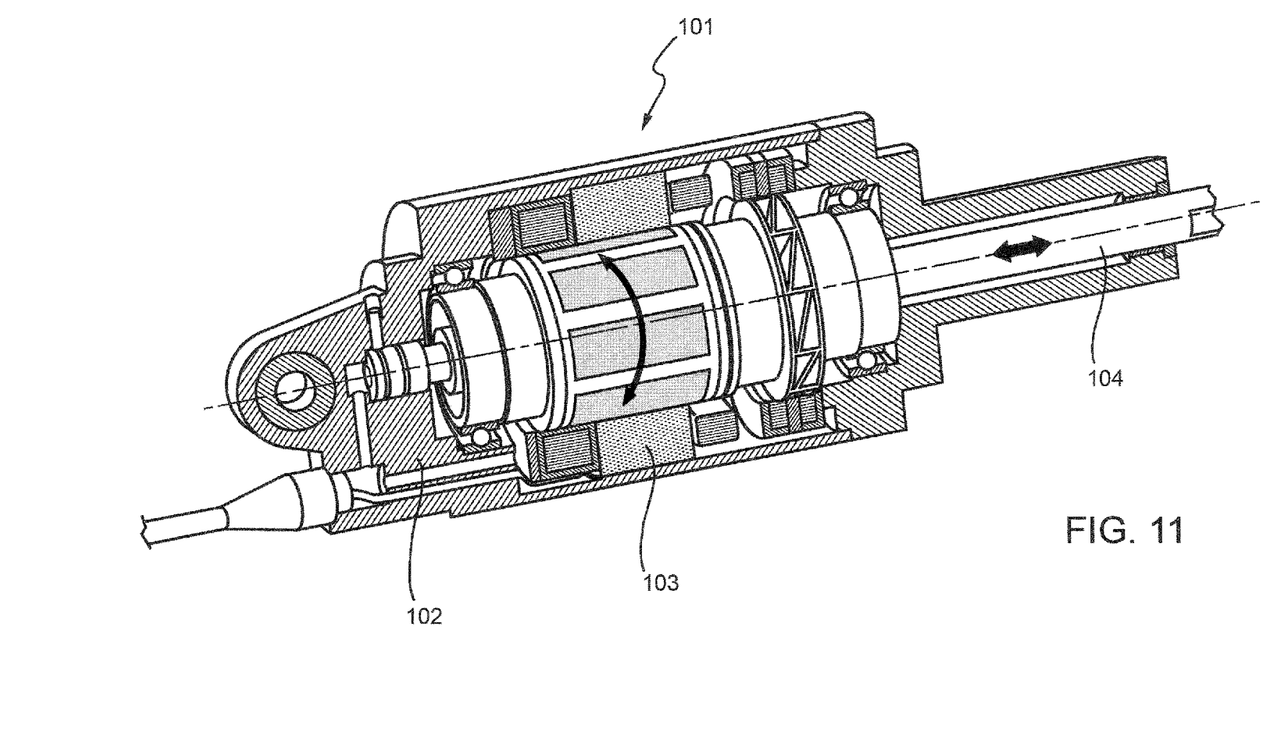
FIG. 11 is a partially sectional perspective view of the linear actuator in FIG. 10.

Actuator 101 has an end attachment 105, for example integral with body 102, which is hinged to the control lever 27 integral with the control surface S; shank 104 is slidingly mounted in a steerable support 106 connected to a fixed structural element 107 of the aircraft and may be blocked in support 106 by means of a coupling 108, thus being hinged to the fixed structure, or may freely slide therein.

The outgoing rod 23 of the mechanical transmission is conveniently connected to a return rod 109 by means of a hinge 110. In this case, the return rod 26 is coupled to a seat 111, which is integral with body 102 of actuator 101, to which it may be selectively constrained by means of a coupling 112 conveniently similar to coupling 28 in FIG. 3.

As in the above-described embodiments, the flight control system 100 may operate in FBW and manual modes.

In the first case, coupling 108 is closed and therefore the linear actuator 101 may vary the position of the control surface S in response to the controls received from controller 13. Controller 13 may receive incoming signals from absolute sensors associated with the manual control element C and with the movable surface S, or from a differential position transducer associated with coupling 112 and configured to detect directly the position error between the return rod 26 (connected to the manual control element C by means of the mechanical transmission 11) and the body 102 of actuator 101.

In FBW mode, and in a conceptually similar manner to the description of the previous embodiments of the invention, coupling 112 does not completely decouple the mechanical transmission from the control surface S, but maintains the mechanical continuity of the control line but for a predetermined clearance.

The differential position transducer suggested in the aforesaid configuration could be made by connecting the return rod 26 and the body 102 of actuator 101 to each other by means of an elastic connection of suitable rigidity on which force sensors (strain gauges or the like) may be placed, which are adapted to obtain the deformations.

In manual mode, coupling 111 makes the return rod 26 integral with the body 102 of actuator 101, while coupling 108 completely decouples the shank 104 of actuator 101 from the structural element 107.

The advantages allowed by the present invention become apparent from the discussion of the features of the flight control systems 10, 100 described and implemented according to the present invention.

It is an important aspect of the present invention to point out the possibility of implementing an FBW control system on an existing aircraft, provided with purely mechanical rod or cable controls, which may then form a mechanical back-up of the FBW system. For this purpose, it is in fact sufficient to provide the aircraft with an actuator (of rotating or linear type) for each of the control surfaces, with corresponding couplings for selectively connecting the control surface to the actuator and decoupling it from the mechanical transmission, and with the corresponding control electronics.

The burdensome redundancies (quadruple for "safety critical" controls) normally required by safety requirements for a completely electronic system are replaced by maintaining the mechanical chain currently installed, which acts as a back-up of the FBW system and vice versa the latter ensures a back-up for the mechanical system.

Thereby, the advantages of the solution with traditional mechanical transmission in terms of cost competitiveness and implementation flexibility may be combined with the additional functionalities ensured by the FBW solution.

For example, the flight envelope control functionality and the autopilot integration could be allowed, and the RVSM (Reduced Vertical Separation Minimum) requirement could be met, i.e. the ability of the aircraft to operate in civilian airspaces.

The presence of a flight control computer (FCC) and of a servocontrol on the rudder control would also allow improving the lateral-directional flight qualities of an aircraft controlled by mechanical chain and having, for example, dutch-roll problems, by implementing indeed a yaw damper.

The mechanical control line can be decoupled by means of a coupling unit controlled either manually or by a specific servomechanism which is actuated in case of failure of the electrical system, thus permitting the coupling of the kinematic chain. In this case, the electromechanical actuators or their mechanism for the connection with the kinematic transmission chain become an integral part thereof.

In particular, it is apparent that the system of the invention does not consist of two control lines, rather by an integrated chain which can be operated in dual mode, in manual or fly-by-wire mode, at the discretion of the pilot at any time or in case of system failure. This solution ensures the complete control of all the control surfaces in both the options; therefore, both modes allow the complete maneuverability of the aircraft.

Finally, it is apparent that modifications and variants may be made to the flight control systems 10, 100 described, without departing from the scope of protection defined by the claims.

The invention claimed is:

1. An aircraft hybrid flight control system comprising:
   at least one control surface (S),
   a manual control element (C);
   a mechanical transmission (11) for connecting said manual control element to said control surface;
   at least one electromechanical actuator (12; 62; 101);
   a controller (13) associated with the electromechanical actuator (12; 65; 101) and adapted to generate control signals for said actuator (12; 65; 101) in response to incoming signals representing at least the position error of said control surface (S) with respect to a reference position set by means of said manual control element (C), and
   coupling means (16; 28, 42; 46; 108, 111) configured to selectively connect said control surface (S) to said mechanical transmission (11) in a manual control mode and to said electromechanical actuator in a fly-by-wire control mode,
   said coupling means (16; 28, 42; 46; 108, 111) being configured to maintain said mechanical transmission (11) in a condition of substantial continuity with said control surface (S) also in the fly-by-wire mode, but for a freedom of motion of pre-set amplitude, characterised by said coupling means comprising a first coupling (28; 54, 53) interposed between a first element (23; 109) forming part of, or controlled by, said mechanical transmission (11) and a second element (26; 27; 111; 54, 52) rigidly connected to said control surface (S), said first coupling (28) having a first operating position corresponding with said manual control mode, wherein said first and second elements are coupled with each other rigidly, and a second operating position corresponding with said fly-by-wire mode, wherein said first and second elements are coupled with each other with said relative freedom of motion.

2. The system according to claim 1, characterised by said coupling means comprising a second coupling (42; 108) interposed between said actuator (41; 111) and one of a structural element (107) fixed to a structure of the aircraft and a control surface element (27) connected to said control surface (S), said second coupling (42; 108) having a first operating position corresponding with said manual control mode, wherein said actuator (41; 111) is decoupled from said structural element (107) or said element (27) connected to said control surface (S), and a second operating position corresponding with said fly-by-wire control mode, wherein said actuator (41; 111) is coupled rigidly with said structural element (107) or said element (27) connected to said control surface (S).

3. The system according to claim 1, characterised by the actuator (41; 62) being rotating.

4. The system according to claim 1, characterised by said coupling means (54, 53; 54, 52) forming part of a single integrated coupling unit (46).

5. The system according to claim 4, characterised by the coupling unit (46) being rotating.

6. The system according to claim 5, characterised by said coupling unit comprising a shaft (50) connected to the control surface (S), a first cogged wheel (53) rotationally coupled to a rotating element controlled by the mechanical transmission (11), a second cogged wheel (52) coupled to an outgoing element of the actuator (62) and a selector (54) for selectively connecting said shaft (50) to the first and to the second cogged wheel (53; 52), said selector (54) forming said first coupling with the first cogged wheel (53) and a second coupling with the second cogged wheel.

7. The system according to claim 6, characterised by said selector (54) being an internally cogged sleeve permanently coupled with an integrally cogged wheel (51) integral with the shaft (50) and sliding between a first position wherein it engages with the first cogged wheel (53) and a second position wherein it engages with the second cogged wheel (52).

8. The system according to claim 7, characterised by the selector (54) in said second position engaging partially with the first cogged wheel (53) with an angular clearance.

9. The system according to claim 1, characterised by said actuator (101) being linear.

10. The system according to claim 9, characterised by the actuator (101) comprising a first actuator element (102) and a second actuator element (104) mobile between each other telescopically, said first element (102) being connected to said control surface (S), said second element (104) being selectively connectible with a fixed structural element (107) fixed to a structure of the aircraft.

11. The system according to claim 10, characterised by a first coupling (112) being configured to selectively connect a rod (109) of said mechanical transmission to said first element (102), a second coupling being configured to selectively connect said second element (104) with said fixed structural element (107).

12. A reconfiguration method of an aircraft flight control system comprising:
   at least one control surface (S),
   a manual control element (C); and
   a mechanical transmission (11) for connecting said manual control element to said flight surface;
   characterised by comprising the steps of:
   providing at least one electromechanical actuator (12; 62; 101);
   providing a controller (13) associated with the electromechanical actuator (12; 62; 101) and adapted to generate control signals for said actuator in response to incoming signals representing at least the position error of said control surface (S) with respect to a reference position set by means of said manual control element (C), and
   providing coupling means (16; 28, 42; 46; 108, 111) configured to selectively connect said control surface (S) to said mechanical transmission (11) in a manual control mode and to said electromechanical actuator (12; 101) in a fly-by-wire control mode,
   said coupling means (16; 28, 42; 46; 108, 111) being configured to maintain said mechanical transmission (11) in a condition of substantial continuity with said control surface (S) also in fly-by-wire mode, but for a freedom of motion of pre-set amplitude, said coupling means comprising a first coupling interposed between a first element forming part of, or controlled by, said mechanical transmission and a second element rigidly connected to said control surface, said first coupling having a first operating position corresponding with said manual control mode, wherein said first and second elements are coupled with each other rigidly, and a second operating position corresponding with said fly-by-wire mode, wherein said first and second elements are coupled with each other with said relative freedom of motion.

\* \* \* \* \*